United States Patent [19]

Onishi et al.

[11] Patent Number: 5,134,334
[45] Date of Patent: Jul. 28, 1992

[54] ULTRASONIC LINEAR MOTOR

[75] Inventors: Kazumasa Onishi; Koichi Naito, both of Niigata, Japan

[73] Assignee: Alps Electric Co., Ltd., Tokyo, Japan

[21] Appl. No.: 427,267

[22] Filed: Oct. 25, 1989

Related U.S. Application Data

[63] Continuation-in-part of Ser. No. 282,761, Dec. 9, 1988.

[30] Foreign Application Priority Data

Mar. 8, 1989 [JP] Japan .................. 64-55572

[51] Int. Cl.$^5$ ............................. H01L 41/08
[52] U.S. Cl. .................................. 310/323
[58] Field of Search ............... 310/321, 323, 328

[56] References Cited

U.S. PATENT DOCUMENTS

| | | | |
|---|---|---|---|
| 4,642,509 | 2/1987 | Kumada | 310/323 |
| 4,697,117 | 9/1987 | Mishiro | 310/323 |
| 4,705,980 | 11/1987 | Mishiro | 310/323 |
| 4,728,843 | 3/1988 | Mishiro | 310/323 |
| 4,742,260 | 5/1988 | Shimizu et al. | 310/323 |
| 4,784,323 | 11/1988 | Miller | 31/323 X |
| 4,857,791 | 8/1989 | Uchino et al. | 310/321 |
| 4,912,351 | 3/1990 | Takata et al. | 310/323 |

FOREIGN PATENT DOCUMENTS

| | | | |
|---|---|---|---|
| 0155694 | 3/1985 | European Pat. Off. | |
| 63-11070 | 6/1988 | Japan | |
| 0773714 | 10/1980 | U.S.S.R. | 310/323 |
| 0773715 | 10/1980 | U.S.S.R. | 310/323 |
| 2034531A | 6/1980 | United Kingdom | |
| 1578807 | 11/1980 | United Kingdom | |

Primary Examiner—Mark O. Budd
Attorney, Agent, or Firm—Guy W. Shoup; Norman R. Klivans

[57] ABSTRACT

An ultrasonic linear motor has one or two legs driving a rail. The legs are vibrated by piezoelectric elements mounted at an angle to the leg on one end of each leg. The legs and a connecting body are an elastic material such as aluminum.

7 Claims, 10 Drawing Sheets

ULTRASONIC LINEAR MOTOR

CROSS REFERENCE TO RELATED APPLICATION

This application is a continuation-in-part of U.S. patent application Ser. No. 07/282,761, filed Dec. 9, 1988.

BACKGROUND OF THE INVENTION

1. Field of the Invention

The present invention relates to an ultrasonic linear motor suitable for use as a driving source in electronic equipment and in precision instruments.

2. Description of the Prior Art

Recently, there has been developed an ultrasonic motor using a piezoelectric element formed of piezoelectric ceramics serving as a driving source for generating ultrasonic vibration, and this ultrasonic motor is utilized as an actuator for various kinds of equipment. Such an ultrasonic motor has the advantages that it is compact and generates a high torque. Furthermore, since the ultrasonic motor using a piezoelectric element does not generate an electromagnetic wave, an electromagnetic medium is not affected by the motor.

The ultrasonic motor includes a driving member vibrated by the driving source, and the driving member is located in contact with a driven member, so that the vibration of the driving member in a driving direction may be frictionally transmitted to the driven member. The driving member generates a linear vibration or an elliptical vibration as a result of a synthesis of vibrations in two directions perpendicular to each other. Such an ultrasonic motor is structurally classified as a vibrating reed type, a torsional vibrator type or a travelling wave type.

Figure 18:
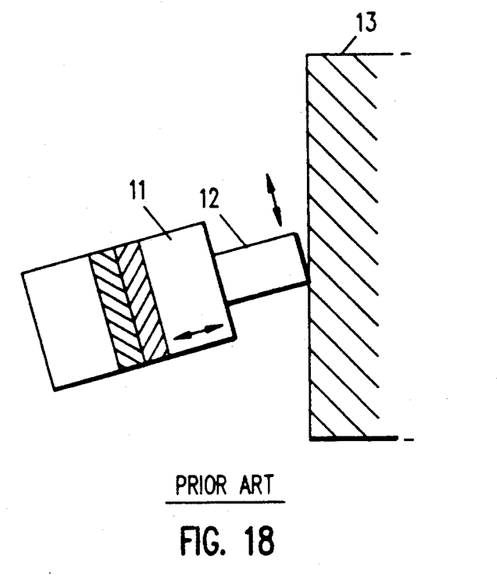
FIGS. 18 to 20 are schematic views of the ultrasonic motors in the prior art.

FIG. 18 shows a vibrating reed type ultrasonic motor constructed of a piezoelectric vibrator 11 vibrating in its longitudinal direction and a vibrating reed 12 attached to the piezoelectric vibrator 11. The vibrating reed 12 is located in oblique contact with a surface of a driven motor 13, so that the driven member 13 may be driven by the vibrating reed 12 in a given direction. The ultrasonic motor of this type exhibits a high energy conversion efficiency and operates at high speed.

Figure 19:
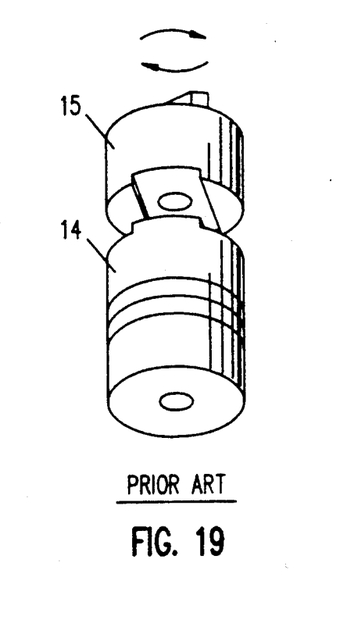

FIG. 19 shows a torsional vibrator type ultrasonic motor constructed of a piezoelectric vibrator 14 vibrating in its longitudinal direction and a torsional connecting member 15 attached to the piezoelectric vibrator 14. The torsional connecting member 15 is flexed by the longitudinal vibration of the piezoelectric vibrator 14 to thereby generate rotational displacement about an axis of the piezoelectric vibrator 14, resulting in the generation of elliptical vibration rather than the linear vibration as mentioned above.

Figure 20:
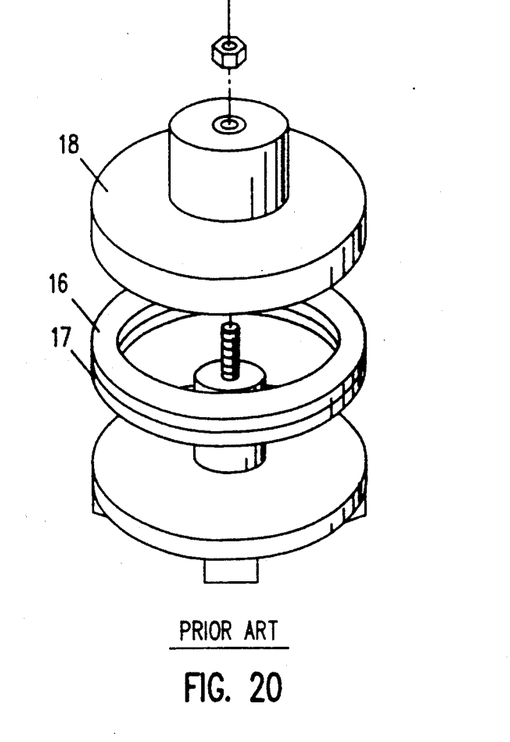

FIG. 20 shows a travelling wave type ultrasonic motor constructed of an annular or disk-like vibrating member 16 and a piezoelectric element 17 attached to the vibrating member 16. The vibrating member 16 is provided with a flexural wave travelling in a circumferential direction by the piezoelectric element 17. A rotor 18 is disposed in contact with the vibrating member 16, so that a contact surface of the rotor 18 contacting the vibrating member 16 is elliptically vibrated by the flexural travelling wave. The ultrasonic motor of this type has the advantage that the contact surface is less subject to wear because the surface area thereof is large.

However, the above-mentioned prior art ultrasonic motors have the following deficiencies.

In the vibrating reed type ultrasonic motor as shown in FIG. 18, the vibrating reed 12 is vibrated by the piezoelectric vibrator 11 to intermittently contact the driven member 13. As a result, the operation of the drive member 13 is unstable, and the driving direction cannot be changed. Further, the tip of the vibrating reed 12 tends to wear out.

In the case of using the torsional vibrator type ultrasonic motor as a linear motor, it is necessary to provide a linear motion converting mechanism.

Similarly, in the case of using the travelling wave type ultrasonic motor as a linear motor, it is necessary to provide a linear motor converting mechanism. Further, the travelling wave type ultrasonic motor has the disadvantage that the energy conversion efficiency is low. If the annular or disk-like vibrating member 16 is replaced by a linear vibrating member to transmit the travelling wave vibration of the linear vibrating member to a linear driven member such as a rail, the travelling wave vibration is transmitted to the rail, causing an increase in energy loss and thus reducing efficiency.

SUMMARY OF THE INVENTION

Accordingly, it is an object of the present invention to provide an ultrasonic linear motor utilizing ultrasonic vibration which has improved energy efficiency.

According to the present invention, an ultrasonic linear motor is provided comprising a vibrating member formed of an elastic material and including a pair of leg portions and a body portion connecting said leg portions, and a vibration source mounted on said vibrating member for applying vibration to said vibrating member. Although the shape of the vibrating member and a method of mounting the vibration source may vary, it is preferable to mount a pair of vibration sources near to the opposite ends of the body portion, so as to improve energy efficiency. Further, it is preferable to set the phase difference in voltages to be applied to the vibration sources at about 90 degrees, so as to efficiently drive the linear motor. The vibration source is normally formed by a piezoelectric element employing piezoelectric ceramics.

In the case that a pair of vibration sources are mounted near to the opposite ends of the body portion, an angle of intersection between the axis of the body portion and the axis of the first vibration source is set to be equal or supplementary to an angle of intersection between the axis of the body portion and the axis of the second vibration source. Further, it is preferable to set at 45 degrees the angle of intersection between the axis of the body portion or one of the leg portions and the axis of one of the vibration sources. However, this angle may be suitably set with consideration to distribution of the components of the vibration.

When the vibrating member is vibrated by the vibration source in the ultrasonic linear motor as mentioned above, a standing wave vibration is generated in the entire structure of the body portion, the leg portions and the vibration source, depending on the material, dimensions, shape and vibration frequency of the entire structure. The standing wave vibration causes a longitudinal vibration, expanding and contracting the body portion and the leg portions in the respective longitudinal directions and a flexural vibration flexing the body portion and the leg portions in the respective lateral directions. The longitudinal and flexural vibrations result in the generation of elliptical vibration at the free ends of the leg portions. Accordingly, when the free ends of the leg portions are disposed in contact with another member (the driven member), the vibrating member and the driven member move relative to each other.

While the elliptical vibrations at the free ends of the two leg portions may have the same phase, it is preferable to suitably shift the phase between the elliptical vibrations, so as to further improve efficiency. Such a phase shift can be provided by mounting a pair of vibration sources on the leg portions and suitable shifting the phase between the alternating voltages applied to the two vibration sources.

DETAILED DESCRIPTION OF THE INVENTION

The following describes several embodiments of the present invention with reference to the drawings.

Figure 1:
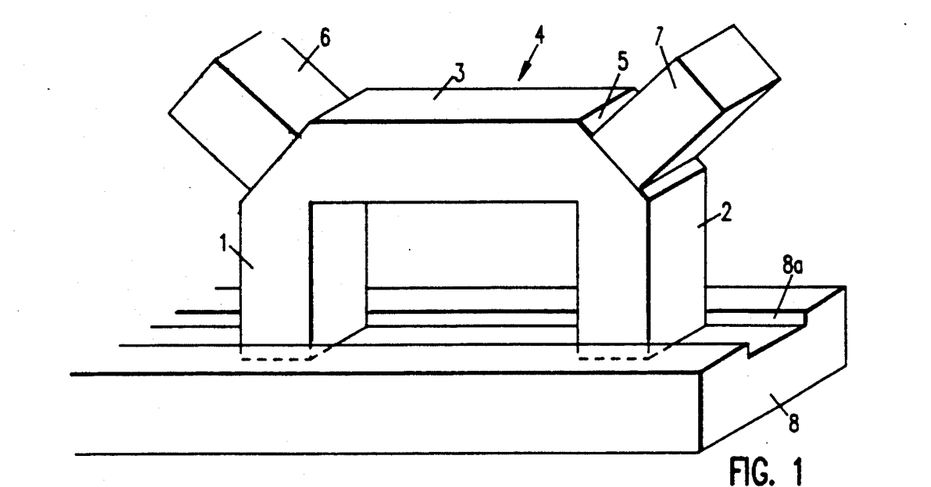
FIG 1 is a perspective view of the first embodiment of the present invention.
Figure 2:
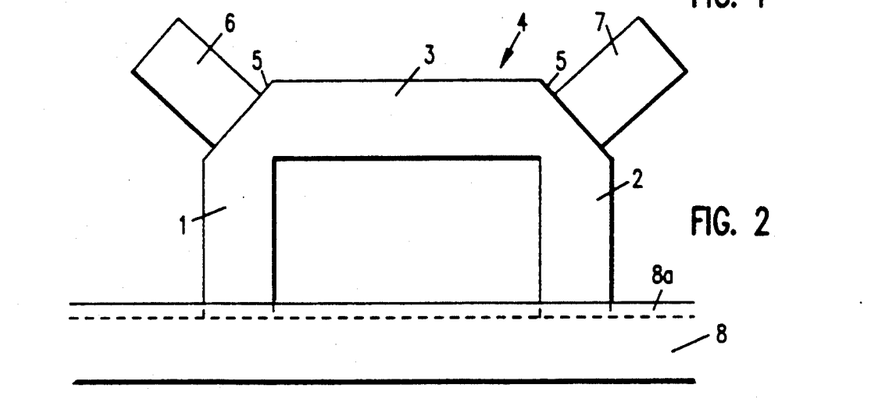
FIG. 2 is a side view of FIG. 1.

Referring first to FIGS. 1 and 2 which show a first embodiment of the present invention, the ultrasonic linear motor is comprised of a vibrating member 4 and a pair of piezoelectric elements 6 and 7 as a source of vibration for applying vibration to the vibrating member 4. The vibrating member 4 is constructed of a pair of parallel leg portions 1 and 2 and a body portion 3 integrally connecting base ends (at the upper ends) of the leg portions 1 and 2 in such a manner as to form a generally inverted U-shape as shown in FIG. 2. The leg portions 1 and 2 and the body portion 3 have a substantially square cross-section. A pair of corners of the inverted U-shaped vibrating member 4 are chamfered at an angle of 45 degrees with respect to the leg portions 1 and 2 and the body portion 3, thereby forming a pair of mount surfaces 5 for mounting the pair of piezoelectric elements 6 and 7 by adhesive or other conventional methods. The piezoelectric elements 6 and 7 expand and contract in a direction perpendicular to the respective mount surfaces 5 when voltage is applied to the piezoelectric elements 6 and 7.

The vibrating member 4 is formed of an elastic material such as aluminum. Examples of the elastic material for the vibrating member 4 include a metal material such as duralumin, iron, brass or stainless steel; an inorganic material such as alumina, glass or silicon carbide; or an organic material such as polyimide resin or nylon. In the preferred embodiment, the body portion 3 is 5 mm square in cross-section and has a length of 26 mm, while the leg portions 1 and 2 are 5 mm square in cross-section and have a length of 10 mm. However, the vibrating member may be of any other convenient dimensions.

The piezoelectric elements 6 and 7 are constructed of a stacked piezoelectric actuator or a single plate piezoelectric ceramic formed of PZT (lead zirconate titanate). The piezoelectric elements 6 and 7 are 5 mm square in cross-section and have a length of 9 mm in the preferred embodiment.

Reference numeral 8 designates a rail driven by the vibrating member 4. The rail 8 has on its upper surface a groove 8a to engage the respective free ends (i.e., the lower ends) of the leg portions 1 and 2. That is, the lower ends of the leg portions 1 and 2 normally contact the bottom surface of the groove 8a, and the groove 8a has a width substantially equal to the length of each side of the leg portions 1 and 2, so that relative movement between the vibrating member 4 and the rail 8 is established.

Figure 3:
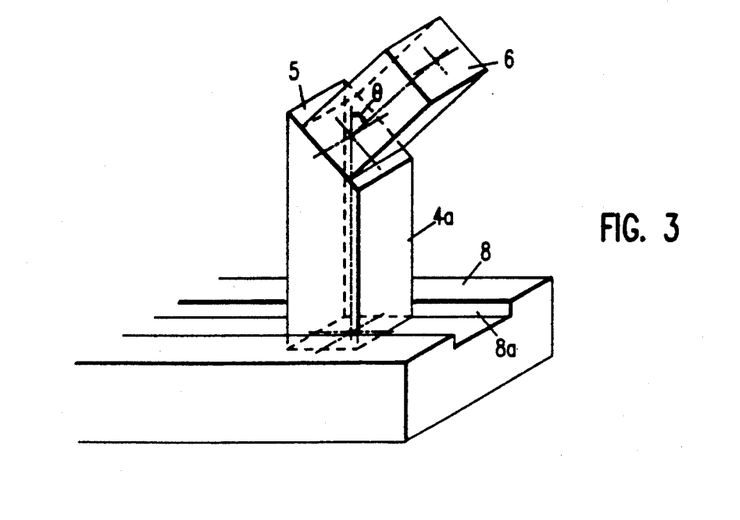
FIG. 3 is a perspective view of another embodiment of the present invention.

FIG. 3 shows another ultrasonic linear motor according to the present invention, similar to the preferred embodiment shown in FIGS. 1 and 2 except that a vibrating member 4a is comprised of a single leg portion and only one piezoelectric element 6 is provided.

The mechanism of the relative movement to be generated by energizing an ultrasonic linear motor in accordance with the invention is described as follows, in accordance with the result of FEM analysis (computer analysis using a finite-element method).

Figure 4A:
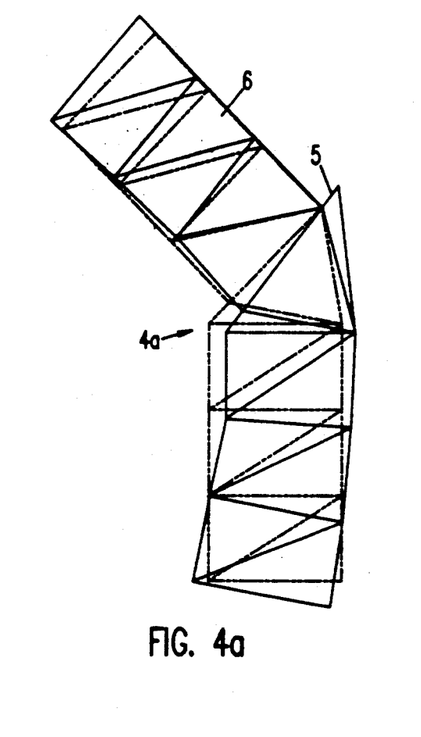
FIGS. 4 and 5 are graphic views of the FEM analysis of the operation of the ultrasonic linear motor shown in FIG. 3.
Figure 4B:
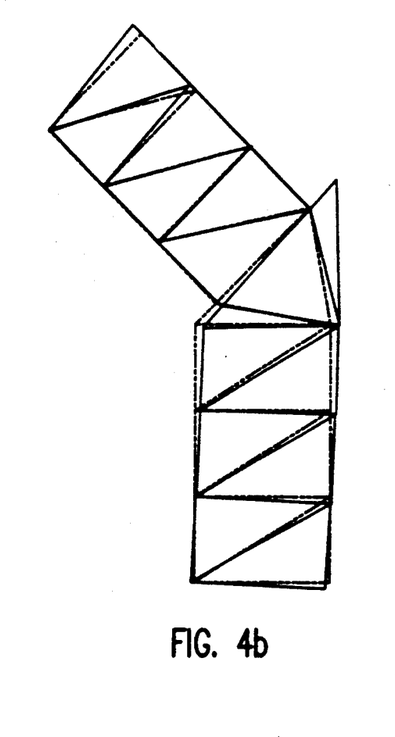
Figure 4C:
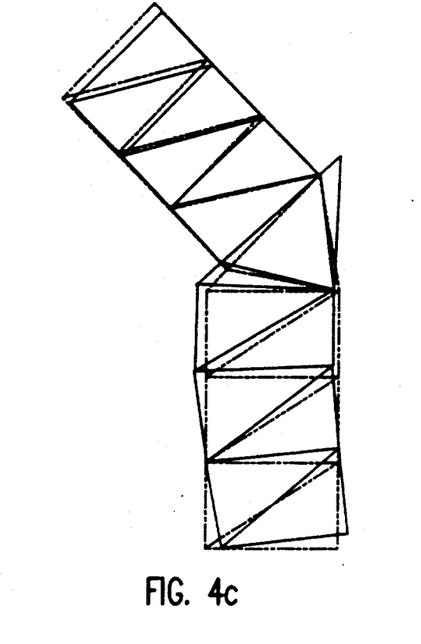
Figure 4D:
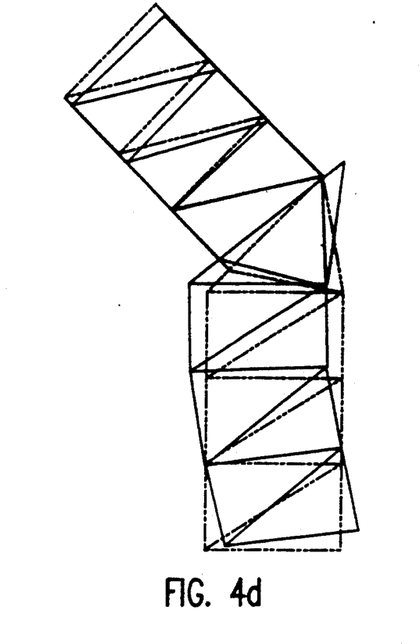
Figure 5:
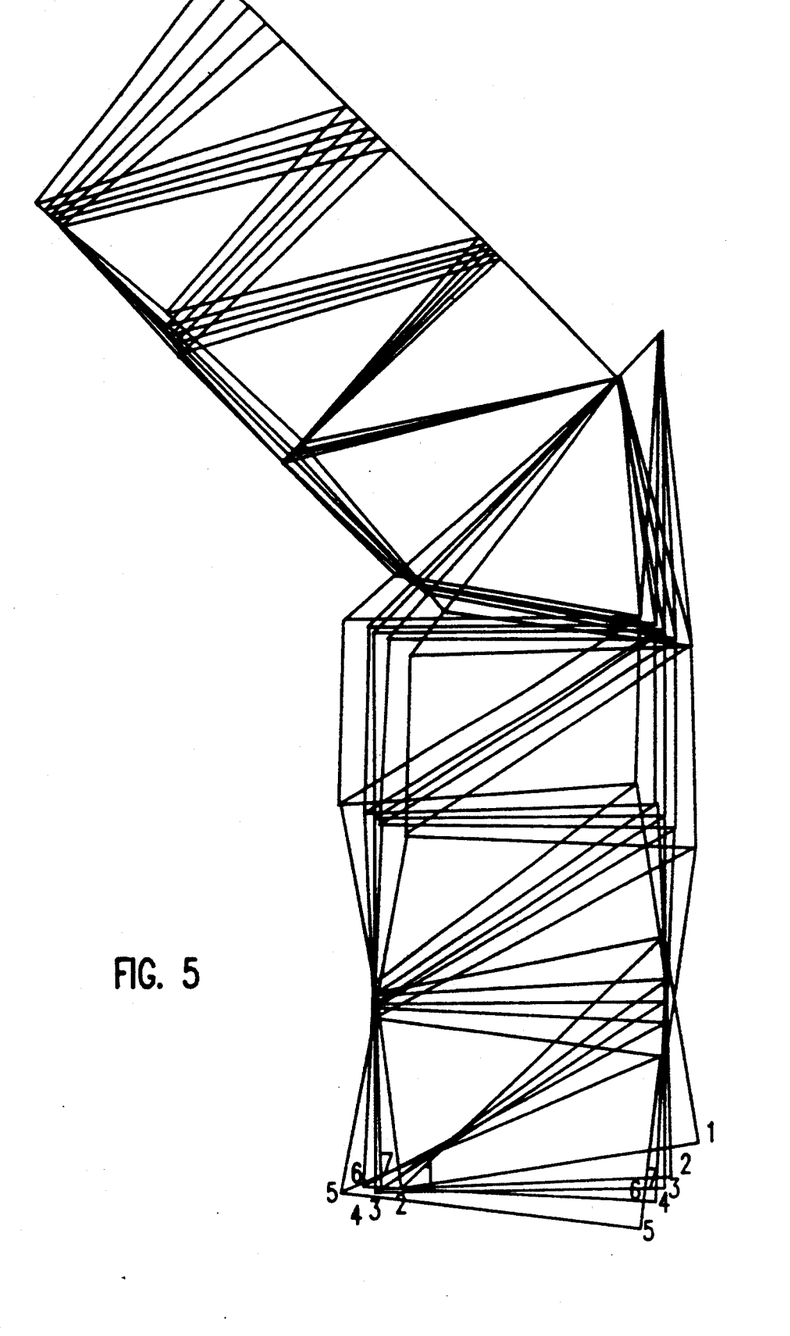
Figure 6A:
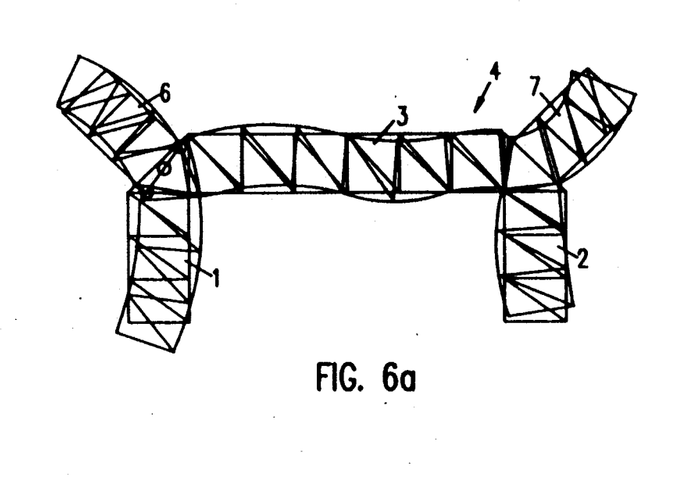
FIGS. 6 to 8 are views similar to FIGS. 4 and 5, according to the present invention.
Figure 6B:
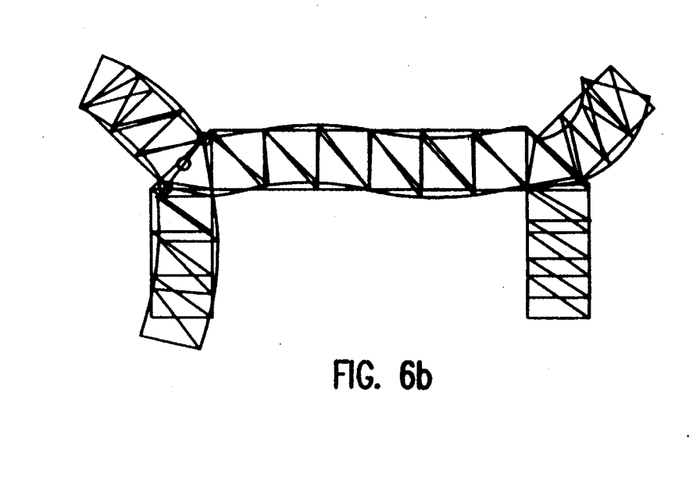
Figure 6C:
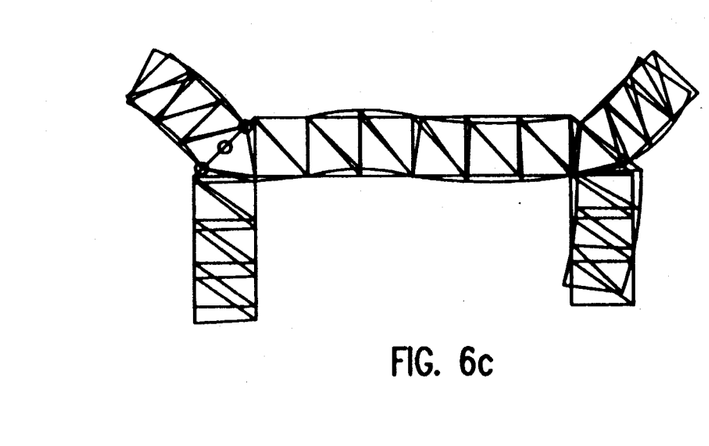
Figure 6D:
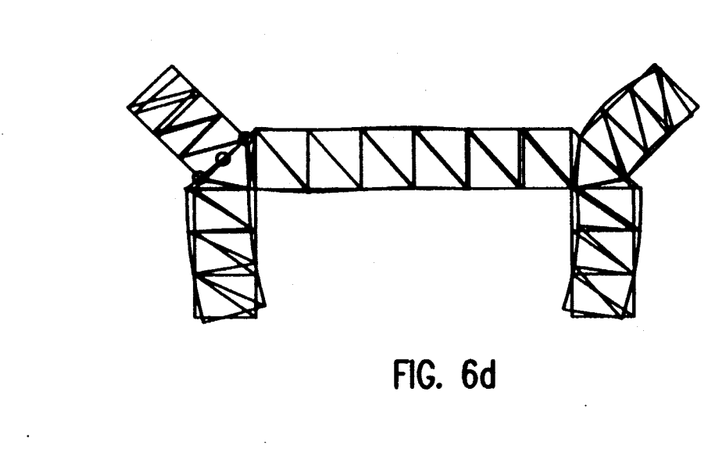
Figure 6E:
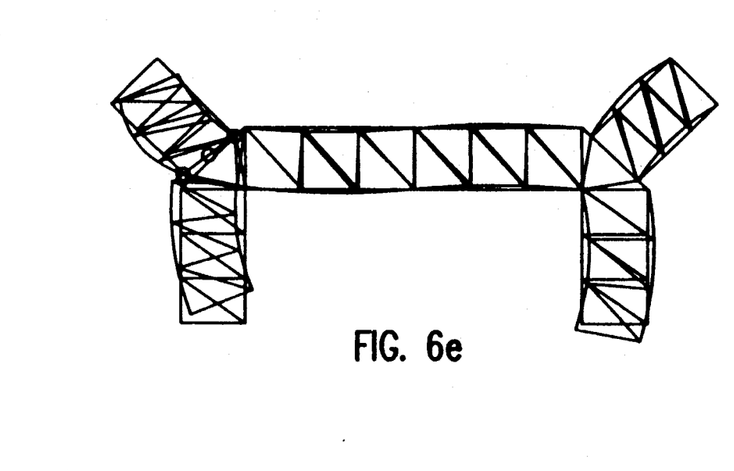
Figure 6F:
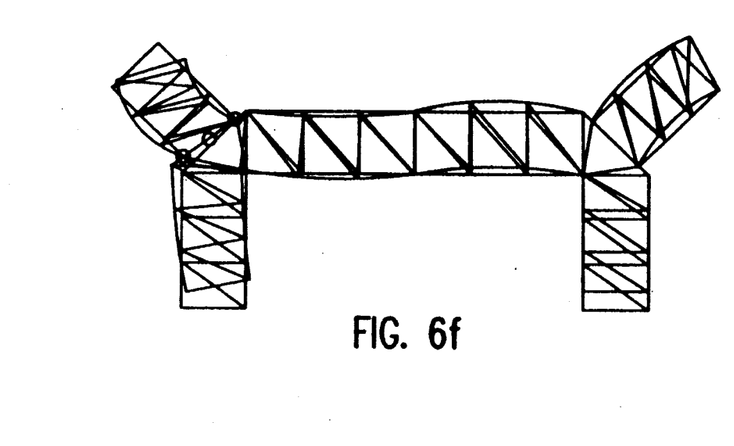
Figure 6G:
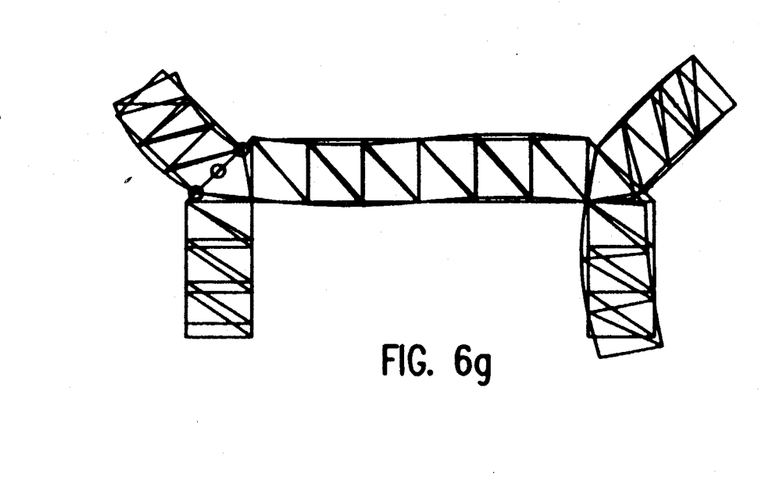
Figure 6H:
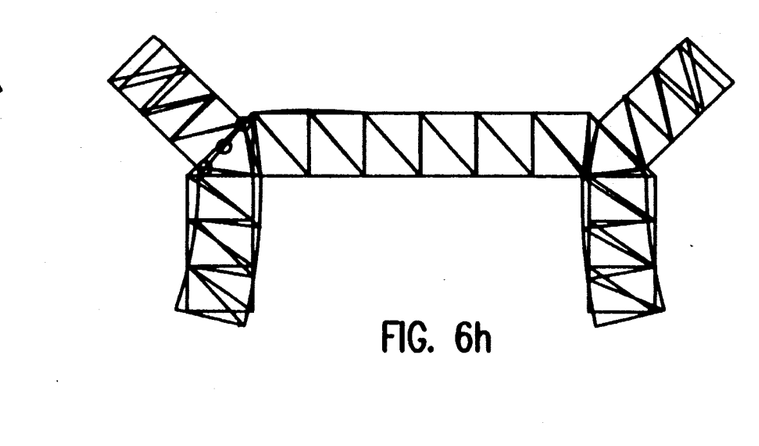
Figure 7:
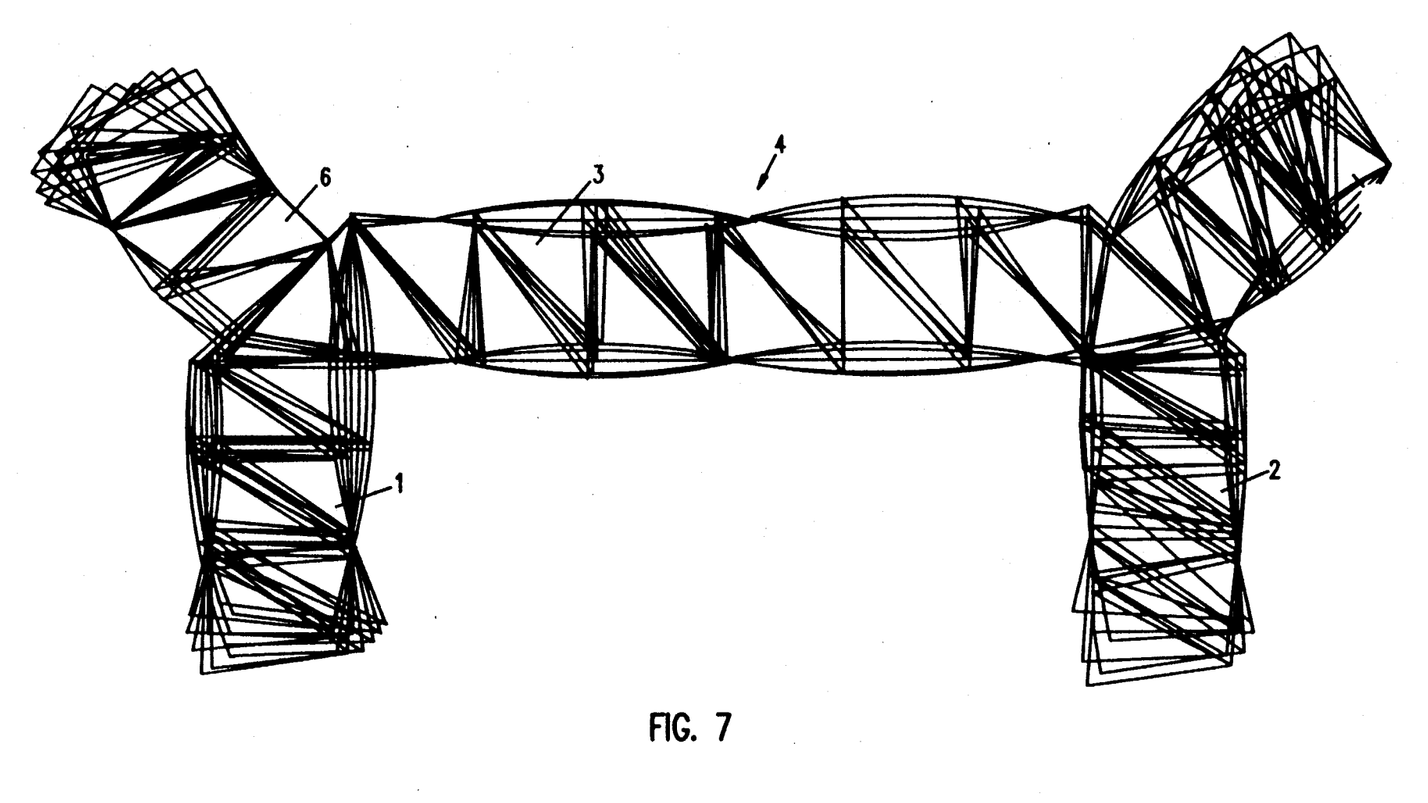

FIGS. 4a, 4b and 5 show the result of simulation by FEM analysis when an alternating voltage of $V = E \cdot \sin \omega t$ is applied to the piezoelectric element 6 of the ultrasonic linear motor shown in FIG. 3. The vibration generated by the piezoelectric element 6 is transmitted through the mount surface 5 to the vibrating member 4a. The component of the vibration parallel to an axis of the vibrating member 4a provides a longitudinal vibration to the vibrating member 4a, while the component perpendicular to the axis of the vibrating member 4a provides a flexural vibration to the vibrating member 4a. As a result, the lower end of the vibrating member 4a is vibrated elliptically. Accordingly, when the lower end of the vibrating member 4a is urged under a given pressure against the upper surface of the driven member 8, the relative movement between the vibrating member 4a and the driven member 8 is generated in the direction of the elliptical vibration. In the case that the driven member 8 is a fixed rail as shown in FIG. 3, the vibrating member 4a moves along the rail 8. In such an ultrasonic linear motor, the mode of the longitudinal vibration or the flexural vibration depends on the vibration frequency of the source of vibration. Therefore, the travelling direction of the vibrating member 4a can be changed by suitably selecting the vibration frequency. The relation between the vibration frequency and the vibration mode, that is, the resultant travelling direction, energy efficiency and driving torque, etc. are determined according to a vibration characteristic of the entire structure formed by the vibrating member 4a and the piezoelectric element 6.

The ultrasonic linear motor of the preferred embodiment as shown in FIGS. 1 and 2 is constructed by connecting a pair of the vibrating members 4a at their upper ends as shown in FIG. 3 through the body portion 3 as shown in FIG. 1, and the principle of the operation of the two embodiments is basically identical. However, the energy efficiency of the ultrasonic linear motor shown in FIGS. 1 and 2 is higher than that shown in FIG. 3.

FIGS. 6a to 6h and 7 show the result of simulation obtained by using the finite-element method (FEM) when an alternating voltage of $Va = E\sin\omega t$ is applied to the first piezoelectric element 6 (on the left-hand side in FIG. 1) and an alternating voltage of $Vb = E\sin\omega t$ is applied to the second piezolelectric element 7 (on the right-hand side in FIG. 1).

The vibration generated by the piezoelectric elements 6 and 7 is transmitted through the respective mount surfaces 5 to the body portion 3 and the leg portions 1 and 2 of the vibrating member 4. The component of the vibration parallel to the axes of the body portion 3 and the leg portions 1 and 2 provides a longitudinal vibration, and the component perpendicular to the axes provides a flexural vibration. The longitudinal vibration and the flexural vibration of the leg portions 1 and 2 are combined to generate an elliptical vibration at the respective lower ends of the leg portions 1 and 2. That is, the elliptical vibration is caused by the combination of the longitudinal and flexural vibrations of the body portion 3 and the leg portions 1 and 2. The vibration mode of the elliptical vibration depends on the vibration characteristic of the integral structure of the vibrating member 4 and the piezoelectric elements 6 and 7, the frequency of the alternative voltages to be applied to the piezoelectric elements 6 and 7, and the phase difference between the alternating voltages applied respectively to the piezoelectric elements 6 and 7. The vibration characteristic of the entire structure depends on the material (e.g., elastic modulus) of the vibrating member 4, the shape (e.g., cross-sectional shape, ratio between the lengths of the body portion and each leg portion), the dimensions, and the contact pressure between the vibrating member 4 and the driven member, for example.

As to the material of the vibrating member 4, the larger the elastic modulus, the less the energy loss due to internal wear, but the less the vibrational displacement. Therefore, the material is preferably selected so that the energy efficiency is optimized. As to the dimension and the shape of the vibrating member 4, the amplitude of the flexural vibration can be increased by increasing the height of the vibrating member, reducing the sectional area of the vibrating member 4, and making the sectional shape of the vibrating member elongated in a direction perpendicular to the travelling direction of the vibrating member 4.

Accordingly, the proper dimensions, the material and the shape of the vibrating member 4 and the proper selection of the vibration frequency and the phase difference of the alternating voltages to be applied to the piezoelectric elements 6 and 7 cause effective longitudinal and flexural vibrations of the body portion 3 and the leg portions 1 and 2, resulting in the generation of the elliptical vibration having a large amplitude at the respective lower ends of the leg portions 1 and 2.

Figure 8A:
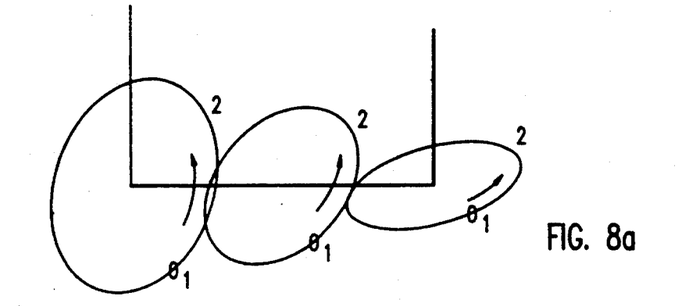
Figure 8B:
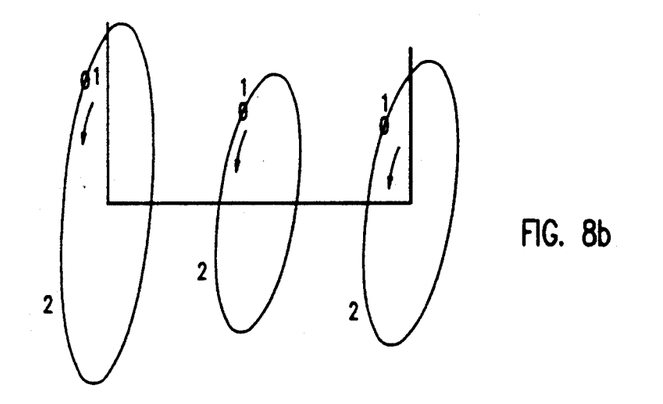

The elliptical vibrations of the leg portions 1 and 2 may be different in shape from each other. As shown in FIG. 8a, the elliptical vibration generated at the lower end of the leg portion 1 on the first piezoelectric element 6 side to which a sine wave is applied is relatively flat in the horizontal direction. On the other hand, as shown in FIG. 8b, the elliptical vibration at the lower end of the leg portion 2 on the second piezoelectric element 7 side to which a cosine wave is applied is relatively flat in the vertical direction. In this case, the frequency of the source of vibration is set at 91.181 kHz.

Figure 9:
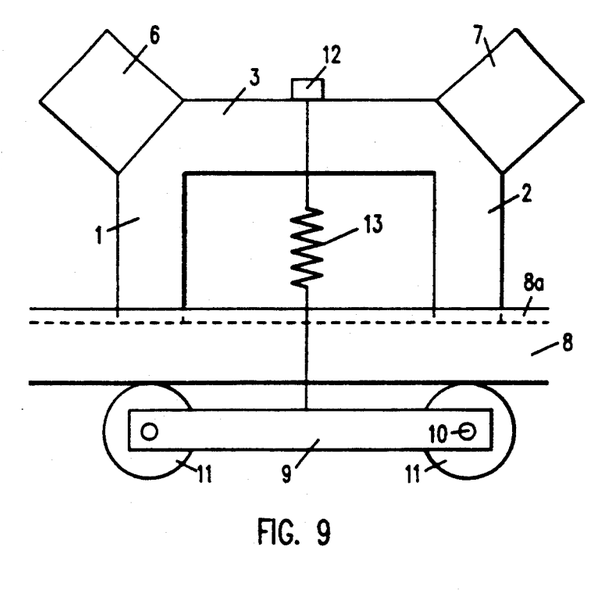
FIG. 9 shows another embodiment of the present invention.
Figure 10:
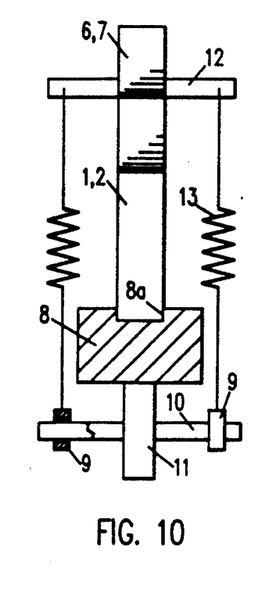
FIG. 10 is a top view of the embodiment shown in FIG. 9.

Referring next to FIGS. 9 and 10 which show another embodiment of the present invention, a pair of front and rear wheels 11 are rotatably supported by a pair of front and rear axles 10, respectively. The front and rear axles 10 are supported by a pair of right and left supporting frames 9 disposed under the rail 8. A transverse upper beam 12 is fixed on the upper surface of the body portion 3 at its longitudinally central position. A pair of coil springs 13 are stretched between the opposite ends of the upper beam 12 and the supporting frames 9 at respective longitudinally central positions, so as to press the lower ends of the leg portions 1 and 2 against the upper surface of the rail 8 (the bottom surface of the groove 8a) and simultaneously press the front and rear wheels 11 against the lower surface of the rail 8. The elastic modulus of the coil springs 13 is suitably selected according to the load to be applied thereto. In the second embodiment, it is advantageous that the ultrasonic linear motor can be utilized with either an inclined or erect position of the rail 8.

FIGS. 11 to 17 show other embodiments of the present invention wherein the mounting position of the piezoelectric elements 6 and 7 is varied.

Figure 11:
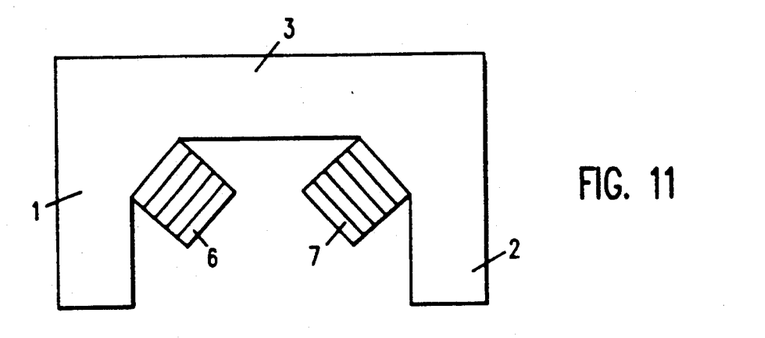
FIGS. 11 to 17 are side views of various embodiments of the invention.

Specifically, FIG. 11 shows that the piezoelectric elements 6 and 7 are mounted on the opposite inside surfaces of the corner portions of the vibrating member 4.

Figure 12:
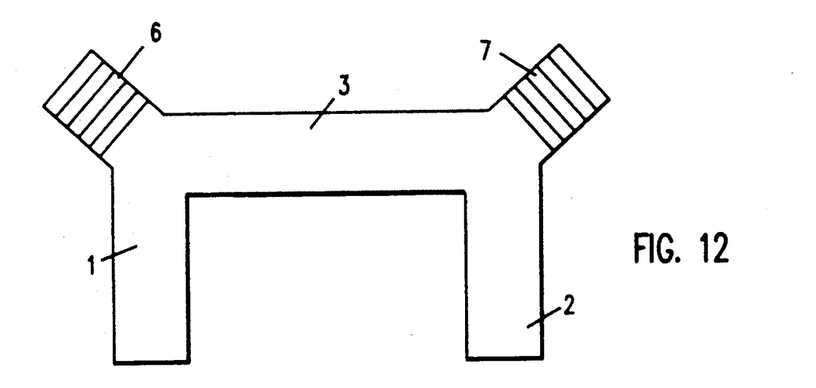

FIG. 12 shows that the corner portions of the vibrating member 4 project outwardly, and that the piezoelectric elements 6 and 7 are mounted on the projecting end surfaces of the corner portions.

Figure 13:
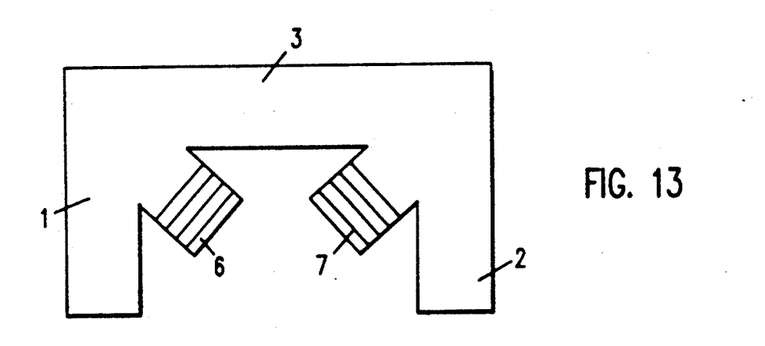

FIG. 13 shows that the opposite inside portions of the corner portions project inwardly, and that the piezoelectric elements 6 and 7 are mounted on the projecting end surfaces of the inside portions of the corner portions.

Figure 14:
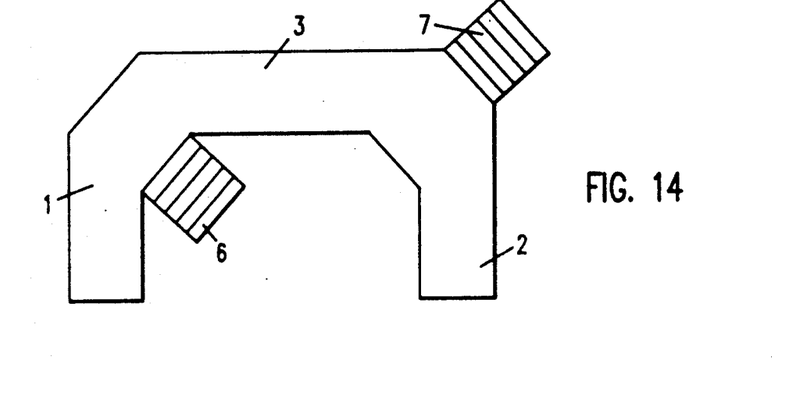

FIG. 14 shows that the first piezoelectric element 6 is mounted on the inside surface of the first corner portion, and that the second piezoelectric element 7 is mounted on the outside surface of the second corner portion.

Figure 15:
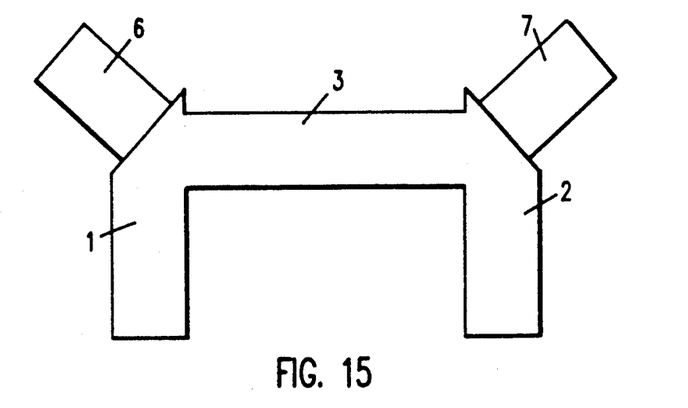

Further, FIG. 15 shows that the body portion 3 is located slightly lower than the upper ends of the leg portions 1 and 2, and that the axes of the piezoelectric elements 6 and 7 intersect the axis of the body portion 3 at the opposite ends of the body portion 3.

Figure 16:
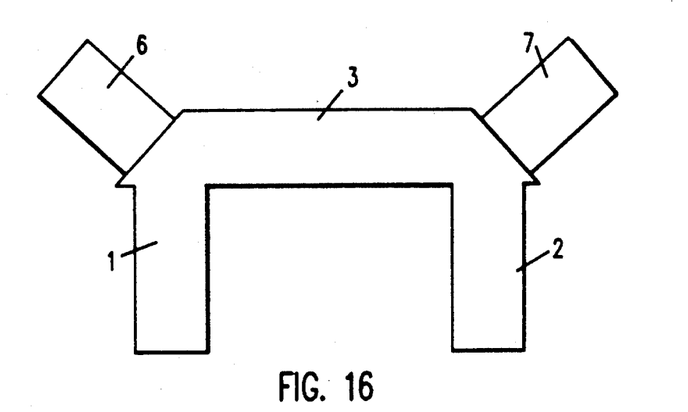

FIG. 16 shows that the leg portions 1 and 2 are located at positions just inside of the opposite ends of the body portion 3.

Figure 17:
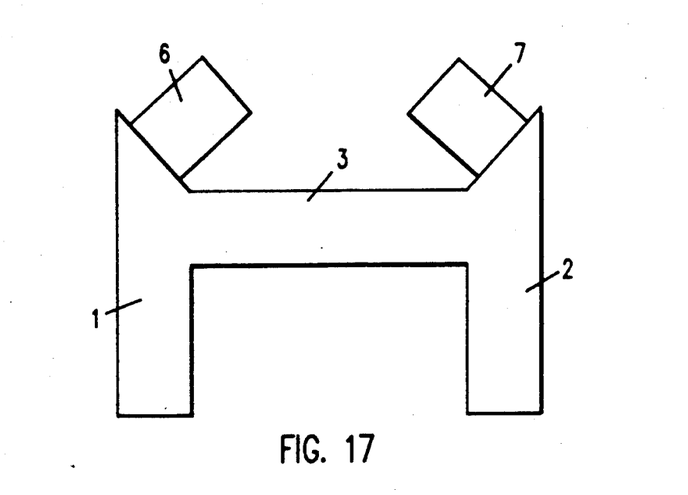

FIG. 17 shows that the body portion 3 is located slightly lower than the upper ends of the leg portions 1 and 2, and that the mount surfaces 5 for mounting the piezoelectric elements 6 and 7 face each other.

The above-mentioned embodiments have various structural features, and each may be suitably selected according to the circumstances where the linear motor is to be used. Although the relation between the travelling direction and the phase difference is different from that in the first embodiment, the basic concept is identical.

In the above embodiments, the axis of the body portion 3 intersects the axes of the piezoelectric elements 6 and 7 at 45 degrees. However, the angle of the intersection is not limited to 45 degrees according to the present invention. That is, it is sufficient that the angle of intersection between the axis of the body portion 3 and the axis of the first piezoelectric element 6 is equal to or supplementary to the angle of intersection between the axis of the body portion 3 and the axis of the second piezoelectric element 7.

Further, although the phase difference between the supply voltages to be applied to the piezoelectric elements 6 and 7 is set at 90 degrees in the above embodiments, which value is the most efficient, the phase difference may be suitably selected in the range 100 to 170 degrees according to the present invention.

In the case that the vibrating member 4 shown in FIG. 1 was used as a traveller and a driving voltage (peak-to-peak voltage) of 5.0 V was applied to the vibrating member 4 at a vibration frequency of 105 kHz and a contact pressure of 1.0 kgf, a maximum speed of the traveller 4 was 0.3 m/sec under no load. Although the above vibration frequency was considered to be most efficient, the range of 80 to 120 kHz was operative.

Further, although a piezoelectric element formed of PZT is used as the vibration source in the above embodiments, any other vibration source such as a magnetostrictive vibrator may be used.

As described above, the ultrasonic motor of the present invention comprises a vibrating member formed of an elastic material, and including a pair of leg portions and a body portion connecting the leg portions and a vibration source mounted on the vibrating member for applying vibrations to the vibrating member. With this construction, the leg portions and the body portion are vibrated by the vibration source to generate the longitudinal vibrations and the flexural vibrations. As a result, elliptical vibrations having a large amplitude at the free ends of the leg portions are generated. Accordingly, the energy efficiency of the ultrasonic linear motor is improved by converting the standing wave vibration of the vibrating member into a linear motion. Further, the longitudinal vibrations and the flexural vibrations generated in the vibrating member may be enhanced by locating a pair of vibration sources near to the opposite ends of the body portion and providing a phase difference in the alternating voltages to be applied to the vibration sources. Accordingly, the energy efficiency can be further improved.

We claim:

1. An ultrasonic linear motor comprising:
    a vibrating member formed of an elastic material and including a first leg and a second leg connected by a body thereby forming a U-shape;
    a first vibration source mounted on a first corner of said U-shape and having an axis of vibration at an angle to an axis defined by a length of the first leg; and
    a second vibration source mounted on a second corner of said U-shape and having an axis of vibration at an angle to an axis defined by a length of the second leg;
    wherein a longitudinal vibration and a flexural vibration are generated in each leg by the vibration sources.

2. The motor of claim 1, wherein both angles are about 45°.

3. An ultrasonic motor comprising:
    at least one leg formed of an elastic material; and
    a vibration source for vibrating the leg having an axis of vibration at an angle of about 45° to an axis defined by a length of the leg and in contact with the leg;
    wherein a longitudinal vibration and a flexural vibration are generated in the leg by the vibration source.

4. An ultrasonic linear motor comprising:
    a vibrating member formed of an elastic material and including two parallel legs and a body connecting said legs;
    a pair of vibration sources mounted about at opposite ends of said body for applying vibration to said vibrating member; and
    means for driving each of said pair of vibration sources independently so as to have a phase difference between the vibrations applied respectively by the vibration sources.

5. An ultrasonic linear motor comprising:
    a vibrating member formed of an elastic material and including a first leg parallel to a second and connected by a body;
    a first vibration source mounted on said body and having an axis of vibration at an angle of about 45° to an axis defined by a length of the first leg; and
    a second vibration source mounted on said body and having an axis of vibration at an angle of about 45° to an axis defined by a length of the second leg;
    wherein a longitudinal vibration and a flexural vibration are generated in each leg by the vibration sources.

6. An ultrasonic linear motor comprising:
    a vibrating member formed of an elastic material and including two legs and a body connecting said legs;
    a pair of vibration sources mounted about at opposite ends of said body for applying vibration to said vibrating member; and
    means for driving each of said pair of vibration sources independently so as to have a phase difference between the vibrations applied respectively by the vibration sources.

7. An ultrasonic linear motor comprising:
    a vibrating member formed of an elastic material and including a first leg and a second leg connected by a body;
    a first vibration source mounted on said body and having an axis of about 45° to an axis defined by a length of the first leg; and
    a second vibration source mounted on said body and having an axis of vibration at an angle of about 45° to an axis defined by a length of the second leg;
    wherein a longitudinal vibration and a flexural vibration are generated in each leg by the vibration sources.

* * * * *